United States Patent [19]

Nakao et al.

[11] Patent Number: 5,139,752

[45] Date of Patent: Aug. 18, 1992

[54] METHOD FOR EXTRACTION OF GOLD AND SILVER FROM ORE WITH A SOLUTION CONTAINING A HALOGEN, HALOGENATED SALT AND ORGANIC SOLVENT

[75] Inventors: Yukimichi Nakao, Tsukuba; Kyoji Kaeriyama, Tsuchiura, both of Japan

[73] Assignee: Agency of Industrial Science & Technology, Ministry of International Trade & Industry, Tokyo, Japan

[21] Appl. No.: 739,234

[22] Filed: Aug. 1, 1991

[30] Foreign Application Priority Data

Aug. 28, 1990 [JP] Japan ................................. 2-226298

[51] Int. Cl.$^5$ ........................... C01G 7/00; C01G 5/00
[52] U.S. Cl. .................................. 423/27; 423/658.5; 423/38; 423/34; 75/722; 75/736; 75/733
[58] Field of Search ....................... 423/27, 32, 34, 38, 423/658.5; 75/733, 736, 722, 634, 637

[56] References Cited

U.S. PATENT DOCUMENTS

| | | | |
|---|---|---|---|
| 738,758 | 9/1903 | Baxeres | 423/27 |
| 2,371,119 | 3/1945 | Nachod | 423/27 |
| 4,500,498 | 2/1985 | Kruesi et al. | 423/100 |
| 4,919,716 | 4/1990 | Nakao et al. | 423/658.5 |

Primary Examiner—Theodore Morris
Assistant Examiner—Edward Squillante
Attorney, Agent, or Firm—Oblon, Spivak, McClelland, Maier & Neustadt

[57] ABSTRACT

From an ore containing gold and silver, the gold and silver are extracted by a method which comprises pulverizing the ore and bringing the pulverized ore into contact with an elemental halogen, a halogenated salt, and an organic solvent thereby converting the gold and silver into polyhalogeno anionic complexes and consequently dissolving them in the organic solvent.

7 Claims, No Drawings

METHOD FOR EXTRACTION OF GOLD AND SILVER FROM ORE WITH A SOLUTION CONTAINING A HALOGEN, HALOGENATED SALT AND ORGANIC SOLVENT

BACKGROUND OF THE INVENTION

1. Field of the Invention

This invention relates to a method for the extraction of gold and silver from ore. More particularly, this invention relates to a method for extracting gold and silver into an organic solvent from ore, which method is characterized by causing the ore to contact an elemental halogen, a halogenated salt, and an organic solvent.

2. Prior Art Statement

Numerous methods have been proposed to date for extraction of gold and silver into a solution from an ore containing gold and silver. Among these conventional methods, the cyanide method excels in operational efficiency and economy and has found the most extensive utility. This method comprises bringing pulverized ore into contact with air in an aqueous solution of calcium cyanide (or potassium cyanide or sodium cyanide) thereby oxidizing gold and silver and converting the gold and silver into a water-soluble cyan complex and extracting the cyan complex ("Science of Noble Metals, Fundamentals", page 364, compiled by Taira Suzuki and Kenjiro Meguro and published by Tanaka Kikinzoku K. K.).

The cyanide method has the disadvantage that the operation thereof is highly dangerous because it requires use of a large amount of a highly poisonous cyan compound and the step of extraction consumes a long time because the oxidation reaction of gold and silver with the oxygen in the air progresses slowly.

The present inventors conducted a study in search of a method for safe and highly efficient extraction of gold and silver through which they found that gold and silver contained in an ore are readily dissolved in an organic solvent containing an elemental halogen and a halogenated salt. The present invention has been completed as a result.

SUMMARY OF THE INVENTION

Specifically, this invention concerns a method for the extraction of at least one noble metal selected from the group consisting of gold and silver from an ore containing the noble metal, which method comprises pulverizing the ore and bringing the pulverized ore into contact with (A) an elemental halogen, (B) a halogenated salt, and (C) an organic solvent thereby selectively dissolving the noble metal into the organic solvent.

DESCRIPTION OF THE PREFERRED EMBODIMENT

In the method of the present invention, the gold and silver contained in an ore are converted into easily dissolvable compounds by pulverizing the ore and bringing the pulverized ore into contact with an elemental halogen, a halogenated salt, and an organic solvent.

The gold and silver in the ore, on being combined with a halogen atom provided from the elemental halogen, form halogenides of gold and silver. These halogenides are extracted into the organic solvent owing to their conversion into polyhalogeno-anionic complexes by the action of the halogenated salt.

Though the time required for the extraction of gold and silver varies with the kind of the elemental halogen, the kind and concentration of the halogenated salt, and the kind of the organic solvent used, the extraction is generally completed in a matter of hours. The temperature of the treatment is selected in a range whose upper limit does not exceed the boiling point of the organic solvent. Naturally, the time spent for the extraction decreases in proportion as the temperature of the treatment increases.

The elemental halogens which are effectively usable in the method of the present invention include chlorine, bromine, and iodine in the elemental form.

The halogenated salts which are effectively usable in the method of this invention include halogenated quaternary nitrogen compounds and halogenated metal salts, for example. The halogenated quaternary nitrogen compounds are the compounds represented by the general formula:

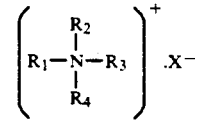

(wherein $R_1$, $R_2$, $R_3$, and $R_4$ independently stand for a hydrogen atom or a hydrocarbon group of 1 to 18 carbon atoms, provided that two or more of these substituents jointly form a ring, and $X^-$ stands for a chlorine ion, a bromine ion, or an iodine ion). To be specific, these compounds include halogenated ammonium salts such as ammonium chloride, halogenated hydrogen salts of primary, secondary, and tertiary amines such as methylamine hydrochloride, dimethylamine hydrobromide, and trimethylamine hydrobromide, and halogenated quaternary ammonium salts such as tetramethylammonium bromide and cetylpyridinium bromide, for example. As halogenated metal salts, halogenides of alkali metals and alkaline earth metals prove to be particularly suitable. Potassium bromide, sodium iodide, and calcium bromide are concrete examples. The elemental halogen and the halogenated salt are both required to be used in an amount of not less than an equimolar amount relative to the amount of gold and silver in the ore. To heighten the ratio of extraction, they must be used in an amount of at least 1.5 mols per mol of the gold and silver.

The organic solvents which are effectively usable in the method of this invention are liquid hydrocarbons, ketones, esters, ethers, nitriles, nitrated hydrocarbons, and halogenated hydrocarbons. Benzene, toluene, acetone, ethyl acetate, dioxane, acetonitrile, nitrobenzene, and bromobenzene are examples. From the practical point of view, benzene proves to be ideal.

The method of the present invention for the extraction of gold and silver from the ore, as demonstrated in the working examples set out below, is easy to conduct and effects the extraction of gold and silver with high efficiency. Moreover, the elemental halogen, the halogenated salt, and the organic solvent used for the extraction are inexpensive and not dangerous. By the method of this invention, therefore, the extraction of gold and silver from the ore can be accomplished economically and safely.

The present invention will now be described more specifically with reference to working examples.

EXAMPLE 1

Quartzite ore (found by fire assay to contain 13.1 ppm of gold and 389.2 ppm of silver) produced at Asahi Mine in Hyogo Prefecture was pulverized to a particle size smaller than 200 mesh. Separately, three lots of a solution having 5 mmols of bromine and 10 mmols of cetylpyridinium bromide dissolved in 100 g of benzene were prepared. In the first lot of benzene solution, 50 g of the pulverized ore was stirred and refluxed (at a liquid temperature of 80° C.) for one hour and subjected to separation by filtration. The residue from the filtration was heated and separated by filtration once each in the second and third lots of benzene solution. The resultant residue was washed with 100 g of hot benzene, subjected to separation by filtration, and dried. The residue from the last extraction was found to contain 0.1 ppm of gold and 0.4 ppm of silver. The results indicate that the ratios of extraction of gold and silver were 99.3% and 97.3%.

EXAMPLE 2

Three lots of a solution having 5 mmols of iodine and 10 mmols of sodium iodide dissolved in 100 g of acetone were prepared. By using the three lots of the acetone solution sequentially and following the procedure of Example 1, 50 g of the same pulverized ore as used in Example 1 was stirred and refluxed (at a liquid temperature of 56° C.) for one hour and then subjected to separation by filtration. The resultant residue was washed with 100 g of hot acetone, subjected to separation by filtration, and dried. The residue of extraction was found to contain 0.1 ppm and 25.4 ppm respectively of gold and silver, indicating that the ratios of extraction of gold and silver were 99.3% and 93.5%

What is claimed is:

1. A method for the extraction of at least one noble metal selected from the group consisting of gold and silver from an ore containing said noble metal, which method comprises the steps of:
   pulverizing an ore containing at least one noble metal selected from the group consisting of gold and silver; and
   bringing the pulverized ore into contact with a solution of
   (A) a halogen selected from the group consisting of chlorine, bromine and iodine,
   (B) a halogenated salt, and
   (C) an organic solvent which is at least one member selected from the group consisting of liquid hydrocarbons, ketones, esters, ethers, nitriles and nitrated hydrocarbons,
   wherein said halogen and said halogenated salt are used each at least in an equimolar amount relative to the amount of gold and silver in said ore, thereby extracting said noble metal into said organic solvent in the form of polyhalogeno-anionic complexes.

2. A method according to claim 1, wherein said halogenated salt is a halogenated quaternary nitrogen compound represented by the formula;

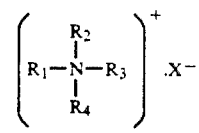

(wherein $R_1$, $R_2$, $R_3$, and $R_4$ independently stand for a hydrogen atom or a hydrocarbon group of 1 to 18 carbon atoms and $X^-$ stands for one member selected from the group consisting of chlorine ion, bromine ion, and iodine ion).

3. A method according to claim 2, wherein at least two of the substituents $R_1$, $R_2$, $R_3$, and $R_4$ are hydrocarbon groups which jointly form a ring.

4. A method according to claim 2, wherein said halogenated quaternary nitrogen compound is at least one member selected from the group consisting of halogenated ammonium salts, halogenated hydrogen salts of primary, secondary, and tertiary amines, and halogenated quaternary ammonium salts.

5. A method according to claim 1, wherein said halogenated salt is a halogenated metal salt.

6. A method according to claim 5, wherein said halogenated metal salt is at least one member selected from the group consisting of halogenides of alkali metals and alkaline earth metals.

7. A method according to claim 1, wherein said organic solvent is at least one member selected from the group consisting of benzene, toluene, acetone, ethyl acetate, dioxane, acetonitrile and nitrobenzene.

* * * * *